Dec. 26, 1939.  D. A. MEEKER ET AL  2,185,155

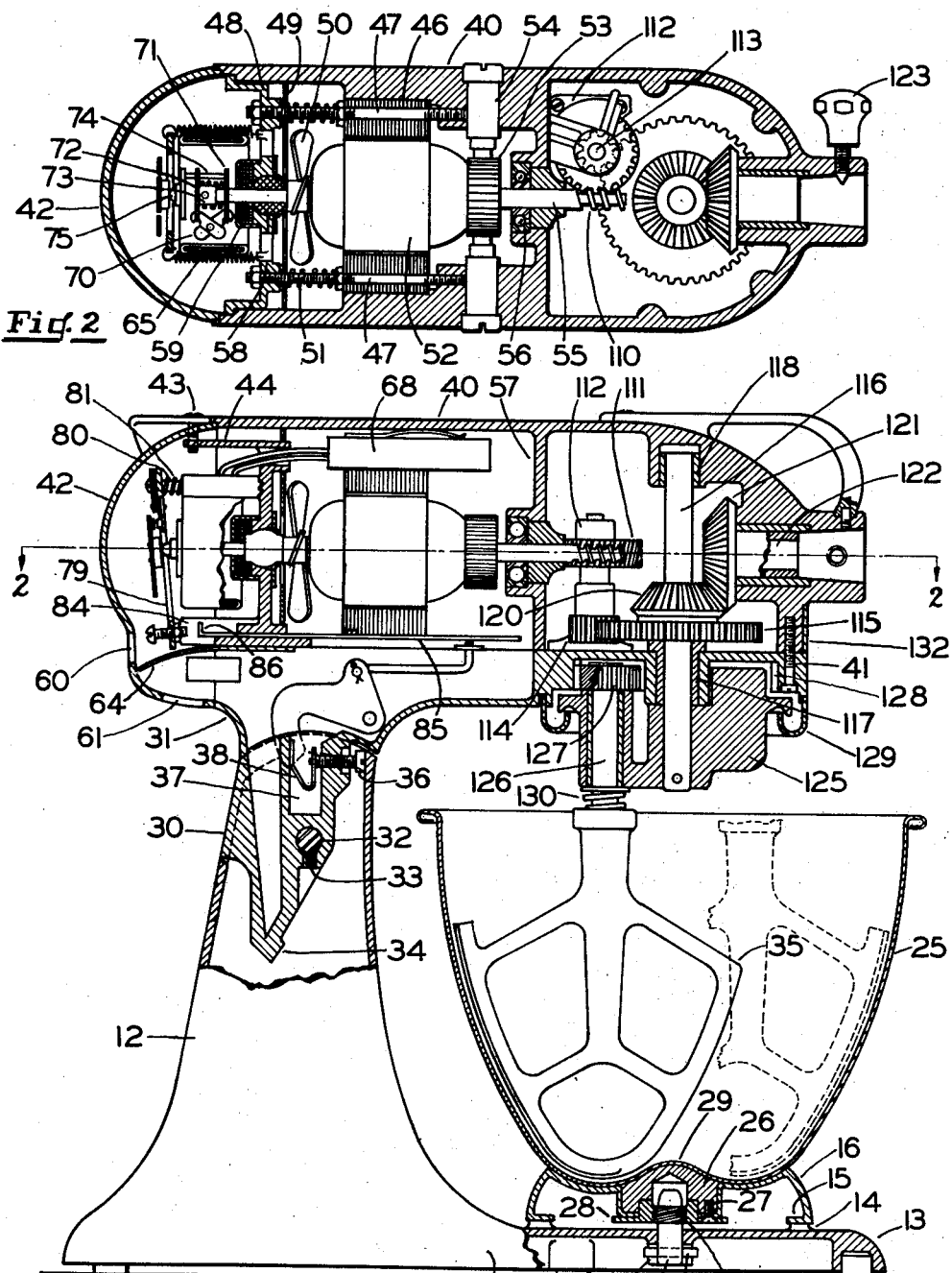

FOOD HANDLING APPARATUS

Filed Nov. 2, 1937  3 Sheets-Sheet 2

INVENTORS
David A. Meeker &
BY Russell C. Geiger
Marechal & Noe
ATTORNEYS

Dec. 26, 1939. D. A. MEEKER ET AL 2,185,155

FOOD HANDLING APPARATUS

Filed Nov. 2, 1937 3 Sheets-Sheet 3

INVENTORS
David A. Meeker &
BY Russell C. Geiger
Marechal & Noe
ATTORNEYS

Patented Dec. 26, 1939

2,185,155

UNITED STATES PATENT OFFICE 2,185,155

FOOD HANDLING APPARATUS

David A. Meeker and Russell C. Geiger, Troy, Ohio, assignors to The Hobart Manufacturing Company, Troy, Ohio, a corporation of Ohio Application November 2, 1937, Serial No. 172,396

7 Claims. (Cl. 259—102)

This invention relates to food handling apparatus.

It is the principal object of the invention to provide a small, compact, lightweight, readily portable food handling device having a wide range of speed and power and adapted for the preparation of various foodstuffs in the domestic kitchen.

It is a further object to provide a device of this character which is easy to operate and in which a mixing bowl is held in operative position on a base by a simple rotating movement and in which the power drive means carrying the rotating beater is mounted for pivotal movement into and out of the bowl.

It is a further object to provide in a food handling device a pivotally mounted drive means which operates a beater with a planetary motion in a bowl, the bowl being fastened in operative position by a simple rotating movement, and in which the beater element in any position thereof may be directly placed in and withdrawn from the bowl upon pivotal movement of the drive means.

It is a further object to provide simple and effective means for fastening the bowl to the supporting base of the device.

It is a still further object to provide a power drive means conveniently enclosed in a casing making for easy assembly and repair and having a decorative and attractive outer appearance.

Other objects and advantages will be apparent from the following description, the accompanying drawings, and the appended claims.

In the drawings—

Fig. 1 is a view partially in section and partly in elevation showing a food handling device constructed in accordance with the present invention.

Fig. 2 is a horizontal sectional view on the line 2—2 of Fig. 1.

Figure 3:
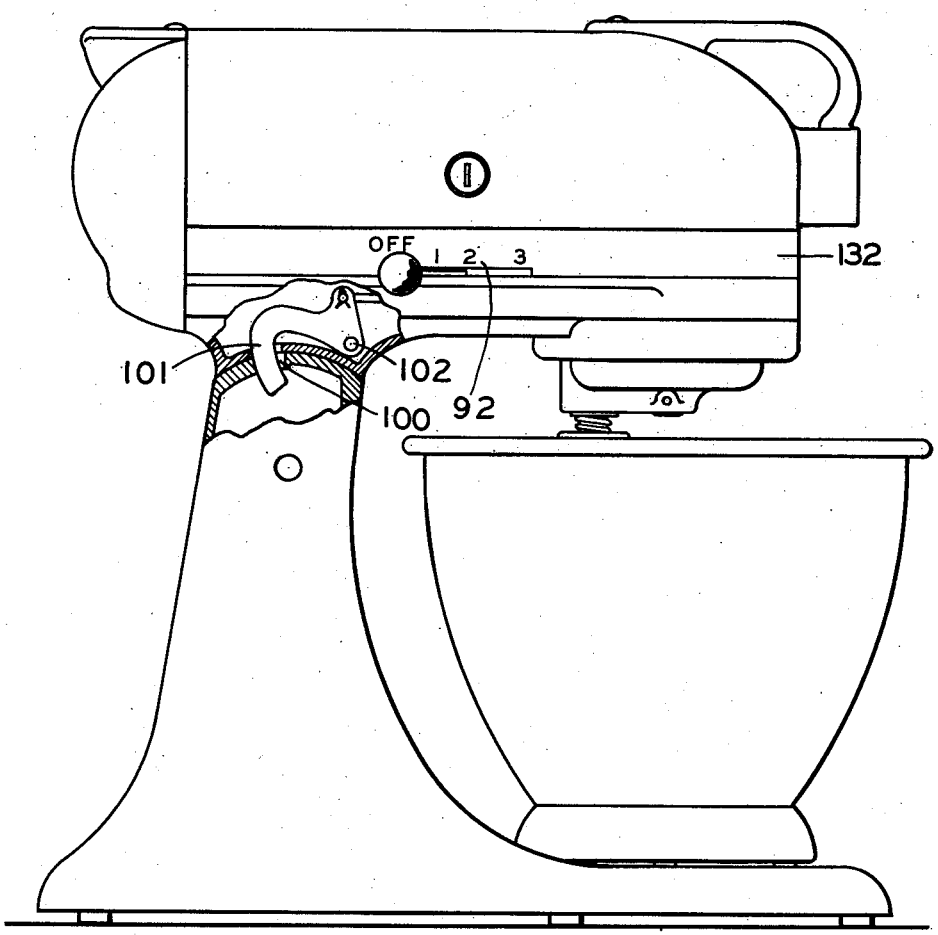
Fig. 3 is a view in side elevation showing the assembled device and with a portion thereof broken away to show the latching construction.
Figure 7:
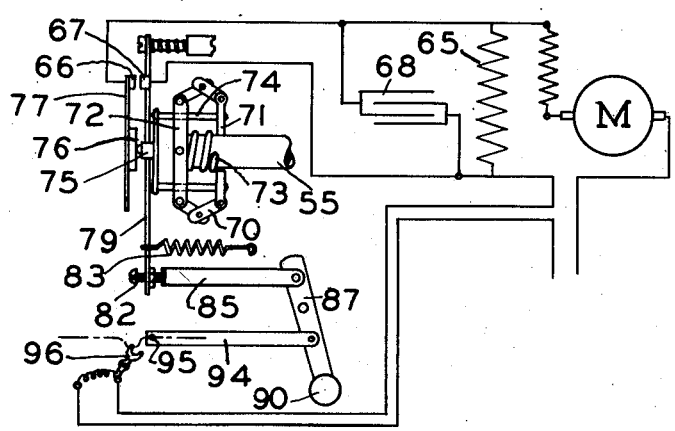
Fig. 7 is a schematic view showing the circuit connections for the speed control arrangement.

Referring now to the drawings which disclose a preferred embodiment of the invention, there is shown at 10 a base structure within which are fixed a number of rubber or other resilient pads 11 adapted to firmly support the device slightly above a supporting surface, and to hold it firmly in place during operation. A pedestal 12 formed integrally with the base extends upwardly at one side thereof. At the opposite side a platform 13 is provided for the reception of the mixing bowl. This platform is formed with a plane top surface, with a number of upwardly extending bosses 14 positioned thereon. As shown, six such bosses are provided, being located around the periphery of a circle such that they lie directly beneath the base portion 15 of the bowl flange 16, the inturned portion 15 providing for the seating of the bowl upon the several bosses. Being machined to a uniform height, a level and firm support for the bowl is thus provided.

Located centrally of the platform is a locking screw 20 formed with a tapered upstanding end and having a threaded shoulder portion 21 of enlarged diameter. The shank of the screw extends downwardly through an aperture in the platform 13 and at its lower portion is provided with a cross pin 22 which extends between downwardly projecting flanges 23, formed integrally with the base member. This structure is such that the threaded screw portion 21 cannot drop through the aperture, but may be drawn upwardly a limited distance while rotation thereof is prevented by means of the pin and flange construction.

The bowl proper is shown at 25 and is preferably formed as an integral spun metal unit, entirely free of projections or attaching means on its side wall or top. Thus it is symmetrical when viewed from any angle, and does not require positioning upon the device in any predetermined angular position. The lower flange 16 is welded to the base of the bowl and is formed to receive a central apertured member 26 to which is fastened, by means of screws 27, a threaded socket 28 adapted to receive the threaded portion 21 of the locking screw 20. A raised portion 29 is formed upon the interior of the bowl at the bottom so that even a small quantity of material may be properly treated.

In the operation of placing the bowl upon the base, the bowl is first placed over the screw 20 so that the threaded end is received within member 28, the flange 15 in this position resting upon the several bosses 14. In the initial positioning of the bowl, screw 20 occupies its lowermost position, and thus does not lift the bowl materially above the supporting bosses, the bowl occupying a position only slightly raised above its final operative position. The bowl is then given a rotating movement, causing the threads of member 28 to engage the threaded portion of the locking screw, thereby upon continued rotation drawing the locking screw upwardly. After engagement of the threads, and rotation to a sufficient extent to provide proper holding action, the locking screw is pulled up against cross pin 22, and the bowl thereby firmly locked in definite and predetermined position. Being supported around the periphery of the base on the several bosses, and being firmly locked centrally, the bowl is definitely locked in proper and desired operating position. In practice it has been found that a turn of less than half a revolution is adequate to provide for the proper threading and locking engagement of the bowl upon the locking screw. And by reason of the fact that the locking screw occupies its lowermost position at the time the bowl is placed thereon, it is not possible for the bowl to be tilted materially away from the horizontal position, and therefore assurance is provided that the screw threaded part will not be jammed in fastening the bowl in position, and that proper engagement of the threaded parts will consistently take place.

The pedestal 12 provides for pivotally supporting the power drive unit which extends in overhanging relation with respect to the base and the bowl positioned thereon. For this purpose the top of the pedestal is curved in an arcuate manner as shown and is provided with a centrally arranged aperture for the reception of the tongue 30 formed integrally with the lower casing member 31 of the power unit. Tongue 30 receives the pivot pin 32 which extends on either side thereof into the wall of the pedestal 12 for rotation therein. Set screw 33 provides for locking the pin 32 in the tongue so that the pin will be caused to rotate at the spaced supports in the side wall of the pedestal.

A projection 34 is provided adjacent the lower end of the tongue and is adapted to abut the inner wall of the pedestal when the assembly is rotated to lift the beater element 35 from the bowl, this projection serving as a limit means for determining the uppermost position. This position is such that the center of gravity lies to the left of the pivot axis as shown in Fig. 1 so that the device will remain in that position under gravity.

Means are also provided for limiting the lowermost position of the device, to secure accurate location of the beater with respect to the bottom of the bowl. This means comprises a screw 36 threadedly mounted in a portion of the tongue 30 above the pivot axis 32. The end of the screw 36 extends into a recess 37 in the tongue within which is located a spring tension member 38 which serves to yieldably retain the screw in any predetermined position of adjustment. The head of the screw is adapted to abut against the upper portion of the side wall of the pedestal, as shown in Fig. 1, to determine and limit a downward movement of the power device. Adjustment of the screw is effected in the raised position of the device at which time access may be secured to the screw through the aperture in the pedestal which receives tongue 30.

It is important in a device of this character adapted for performing a range of beating and mixing operations that the beater closely approach both the side walls and the bottom of the bowl. This is important not only in the treating of a small quantity of material, but also in the treating of lumpy materials, such as in the creaming of butter, the mashing of potatoes and the like. Where the beater does not closely approach the wall, the materials are improperly and incompletely beaten or treated, and it is not possible to secure complete and uniform treatment of the entire mass of the material. If the operation is merely continued for an extended period of time in order to secure some treatment of all portions of the material, it is usually found that excessive beating of the more readily treated parts has taken place. Accordingly the present device is so constructed and arranged that by means of setting the screw 36, the beater 35 may be caused to closely approach the bottom of the bowl, the beater preferably being shaped to conform to the shape of the bowl, so that there will be substantially no untreated material in the bottom of the bowl, and so that in each cycle of its planetary movement the beater will closely approach the wall of the bowl over its entire extent.

The power unit which provides for the driving of the beater element is formed of two separable casing parts. The lower part 31 as already described is formed integrally with the supporting tongue 30, and the upper part 40 is preferably formed as an integral unit separable from the lower part, but attached thereto by a plurality of attaching means indicated at 41. Both of these castings are preferably formed of lightweight metal as single die cast units, thereby facilitating the construction and assembly of the completed device. An end cap 42 is positioned in place over the end of the device and held in place thereon by means of attaching screw 43 extending into a rib 44.

The motor unit is entirely contained within the upper housing portion 40, thereby providing for the assembly of this device as a unit, and also for the removal of the upper casing part from the remainder of the device, for repair and the like, thereby avoiding the necessity of dismantling the assembled motor unit when access is desired to other parts of the mechanism. The motor stator 46 comprising a series of laminated plates is mounted directly in the casing portion 40 which itself serves as the motor frame. The plates are bolted in position by means of bolts 47 which extend into the casing and through a web 48 mounted therein, and on which is formed the rib 44. A disc 49 of thin metal or the like is positioned over bolts 47 and is formed with a central apertured part to provide for the passage of cooling air into the interior of the motor casing under the action of cooling fan 50. Springs 51 provide for resiliently holding the disc 49 in proper position and avoiding undesired chattering thereof.

The rotor 52 carries the fan 50 at one end, and a commutator 53 at the other, brush holders 54 extending outwardly of the motor and through apertures in the side wall of the casing 40 providing access to the brushes and the commutator for cleaning and repair. One end of the motor shaft 55 is mounted in a ball bearing 56 positioned in an integrally formed web 57 of the casing 40, the other end of the motor shaft being supported by a composition bearing 58 supported from web 48. Suitable packing saturated with lubricant is provided for the bearing, the packing being held in place by cover 59 thereby providing a bearing which does not require additional lubrication in operation.

The end cap 42 is provided with a series of openings 60 through which air is drawn by the fan 50, the air passing around the motor parts and being discharged downwardly through an additional series of apertures 61 positioned below the apertures 60. A web 62 formed integrally with upper housing member 40 is provided with a central and two side openings 63 adjacent the end of the motor remote from the air admission and discharge openings, thereby forcing the cooling air stream to pass over the entire body of the motor and other parts subject to the heat developed therein. The air then passes down through the several openings 63 and toward the rear of the casing for discharge through apertures 61. A piece of insulating paper material 64 is held in place between the two portions of the housing and extends between the two series of apertures thereby requiring the air to traverse the cooling path as described above.

Control means are provided for causing the motor to operate under desired conditions of speed and load such that the maximum power output will be developed and under predetermined speed conditions. In the food handling art the normal operations to be performed by a device of this character vary materially with regard to the desired speeds and the necessary loads. In accordance with the present invention a control system is provided which assures the proper operation of the device under all normal conditions of use, and which further provides for developing the maximum output of the motor at the predetermined speed selected. It further provides for maintaining a predetermined speed condition such that changes taking place in the load during a mixing operation or the like do not objectionably affect the speed of operation, and such that the operator may confidently leave the device in operation with the assurance that it will continue to operate at the selected speed. The invention further provides for the adjustment of the device to operate at predetermined speeds so that a recipe book may be arranged with instructions for the setting of the device at predetermined speed positions, with assurance that all devices in use will operate at substantially that desired speed condition, even irrespective of normal fluctuations in the voltage of the power supply, and proper food handling operations will consistently result.

For this purpose a universal series type motor is utilized having a wound rotor and embodying a commutator. A resistor 65 is connected in series with the motor windings, and a pair of contacts 66, 67 are arranged to short circuit said resistor under the control of a speed responsive device, to thereby vary the power input to the motor, and to regulate the speed of operation thereof to predetermined values. Condenser means 68 shunted across the contacts 66, 67 overcomes objectionable arcing at the contacts and is resiliently held between the stator and the casing 40.

The speed responsive means comprises a plurality of pairs of centrifugal elements 70 pivoted to each other, the inner ends of which are attached respectively to an inner disc 71 and an outer disc 72. Disc 72 is fastened to shaft 55 and disc 71 floats thereon. Spring means 73 tends to space the discs from each other, this tendency being overcome by the centrifugal action of the weighted members 70 which under the operation of the motor tend to move the inner disc 71 against the action of spring 73 axially of the motor shaft. Attached to disc 71 is a cage structure 74 which supports an operating pin 75 located substantially axially of the motor shaft. Pin 75 is thus adapted to move axially in accordance with the speed at which the motor shaft is revolving. It has bearing engagement with a contact block 76 fastened to the tongue 77 of a W-shaped spring member 78 supported by the outer legs from frame 79. The inner leg 77 carries the contact 66, the contact 67 being fixedly carried by the frame 79 in cooperating position therewith. The frame assembly 79 is carried by bolts 80 which extend from the flange 48 of the casing, and are provided with springs 81 which yieldingly press the frame outwardly against the head of the bolts, while permitting angular shifting in the position thereof. The lower end of the frame carries a set screw 82 and a plurality of spring means 83 provide for drawing the lower end of the frame inwardly toward the motor and against stops 84, thereby bringing the tongue 77 closer toward the operating pin 75.

In order to secure variation in the speed of operation of the motor the position of the frame, and the spacing of tongue 77 with respect to pin 75 is varied. This is accomplished by means of a slide bar 85 having an upturned end 86 adapted to engage against the set screw 82. Slide bar 85 is carried in the upper housing portion and lies above the web 62, its inner end being attached to pivoted lever 87. A curved spring member 88 presses against the slide bar and overcomes the tendency thereof to vibrate in use. Lever 87 is pivoted at 89 to the web 62 and extends between the two housing sections to the exterior of the casing through a slot where an operating knob 90 is positioned. The casing part 40 is also provided with a plurality of notches 91 and a projection is formed on the lever 87, providing for yieldably retaining the same in position in the notches from which it can be removed by a downward and forward movement. Suitable indexing means shown at 92 are provided on the exterior of the casing indicating an off position for example, and three operating positions of different speeds. In response to the movement of lever 87, slide bar 85 is caused to engage set screw 82 in the frame 79, and to thereby pivot the frame, increasing the spacing of the central tongue 77 from pin 75.

Figure 4:
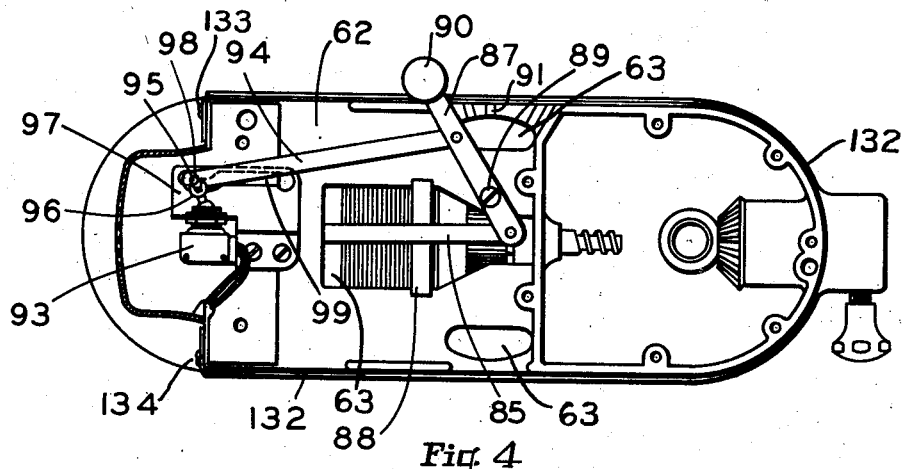
Fig. 4 is a plan view looking upwardly into the upper part of the housing of the power drive device which has been removed from the lower part of the casing.

A motor switch 93 is arranged to interrupt the circuit to the motor and means are provided for actuating the switch from the same lever 87 which actuates the speed control mechanism. For this purpose link 94 is attached to lever 87 and is formed at its end with an upstanding pin 95 adapted to be received in yoke 96 formed on the switch operating lever. A guide plate 97 is fastened to the web 62 of the casing 40 and link 94 carries a guide pin 98 which follows a slot 99 of predetermined configuration formed in the guide plate 97. The configuration of the slot is such that when the lever is moved from the off position as illustrated in Fig. 4, pin 95 engages the yoke 96 to cause movement of the switch lever to closed position; thereafter pin 95 is withdrawn from the yoke 96, and does not reengage the same until the lever is again returned from an operating position to the off position, whereupon the switch is thrown to the off position. Access to the speed control mechanism without disassembling the entire device is secured by removal of end cap 42.

The operation of the control will thus be clear from the foregoing. When the speed control switch is moved from the off to one of the operating positions, the initial movement causes the closing of motor switch 93. The motor is then placed in operation, and upon coming up to a predetermined speed condition, the speed responsive members 70 effect the openings of contacts 66, 67, thereby placing the resistance 65 in circuit with the motor. Immediately upon inclusion thereof in the circuit the motor speed tends to drop, and speed responsive device then causes closing of the short circuiting contacts again with the effect that the resistance is again cut out of circuit. This cycle of action takes place rapidly and the operating speed of the motor is held to a narrow operating range. Upon adjustment of the speed control lever for instance from the number 1 position to the number 3 position, slide bar 85 is caused to engage the lower end of the frame moving it away from the motor, and effecting a greater spacing between the contact pin 75 and the contact block 76. As a result, the motor will come up to a higher speed condition before the contact pin again effects the opening of contacts 66, 67. Similar regulation of the operating speed of the motor will thereupon take place at a higher speed range.

It will be noted that the speed of operation thus is not dependent upon fluctuations in the load or in the characteristics of the power supply within normal operating variations, but is regulated at predetermined actual speed conditions which may be selected with certainty at the time of manufacture, so that satisfactory operating characteristics as regards maintenance of speed under varying load conditions, as well as a definite predetermining of speeds, is assured.

Figure 5:
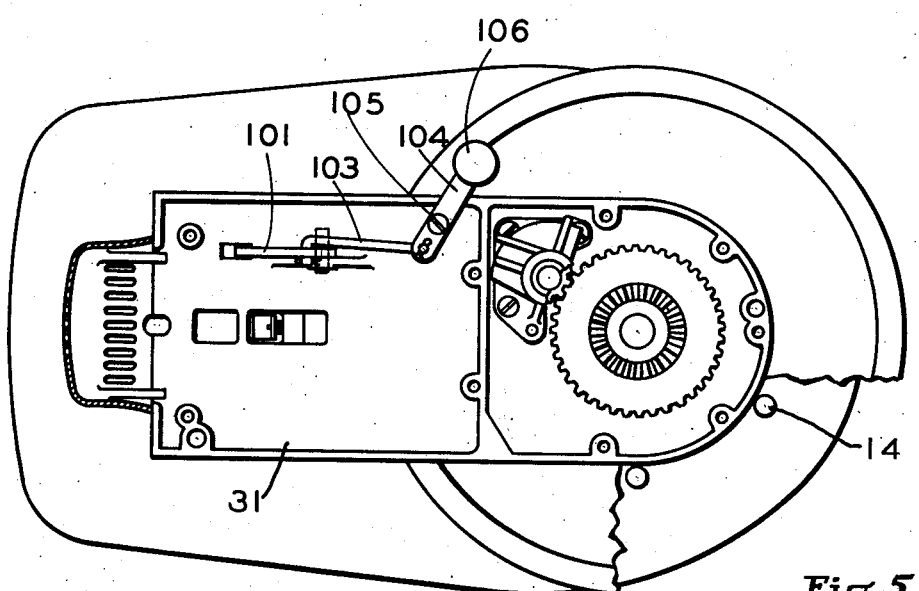
Fig. 5 is a plan view looking down upon the lower part of the casing with the top part removed, a portion of the bowl being broken away to show the base construction.
Figure 6:
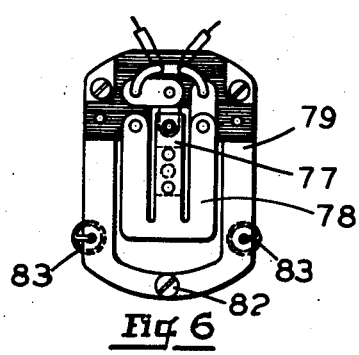
Fig. 6 is a detail view showing a part of the speed control device.

Eccentrically of the tongue 30, the pedestal is provided with an aperture 100 through which there extends a locking finger 101. This finger is pivotally mounted at 102 at the lower casing portion 31 and is arranged to be actuated by link 103 attached to a pivoted locking lever 104. This lever as shown in Fig. 5 is pivotally mounted at 105 upon the lower casing portion 31, and is formed with an outwardly extending handle 106, extending outwardly through a slot between the two casing portions, and located upon the side of the device opposite that which carries the speed control member. This lever has a locking and an unlocking position, the parts being shown in Fig. 3 in the locking position in which the power device is prevented from being rotated about the pedestal. In the unlocking position the lever is thrown in the opposite direction, withdrawing the tongue from the aperture, and permitting free pivotal movement of the power unit casing, to effect the lifting of the beater out of the bowl. It will be noted that lever 104 being mounted upon the lower casing section and lever 87 upon the upper, and both levers extending outward through slots formed along the parting line of the two casing sections, each casing assembly is completely self-contained and the device may thus be assembled and disassembled readily. The rearward edge of finger 101 which bears against the edge of the slot in locking position is slightly eccentric with respect to pivot 102. This provides a camming action so that a firm locking connection will be established notwithstanding differences in the position of the power drive with respect to the pedestal as determined by the adjustment of limit screw 36.

The inner end of the motor shaft 55 is formed with a worm 110 which is adapted to engage with a worm gear 111. The worm gear, preferably formed of molded material in order to reduce the noise of operation thereof, is mounted in a bracket 112 which is bolted to the lower casing structure 31. The assembly comprises the worm gear 111, a vertical shaft 113 which is driven thereby, and a lower pinion 114, driven from the shaft. It will be understood that upon separation of the two portions of the casing this entire assembly is withdrawn from the recess formed in the upper housing portion, and remains attached to the lower housing portion.

Meshing with pinion 114 is a large diameter gear 115 which is fixed to the drive shaft 116. The shaft 116 is supported in a lower bearing 117 formed in the lower casing portion 31, and its upper end is guided in a bearing 118 formed in the upper housing portion 40, from which bearing the shaft is freely withdrawable in a downward direction upon separation of the parts of the casing. The shaft 116 also carries a bevel gear 120 meshing with another bevel gear 121 which provides for driving a non-circular socket 122 extending outwardly from the forward end of the device for the attachment of any desired device such as juice extractor, ice cream freezer, and the like. Set screw 123 provides for the retaining of such attachment in proper driving engagement with the socket 122.

Shaft 116 also provides for the driving of a rotating planetary head 125 which is pinned to shaft 116 and in which the planetary shaft 126 is journaled. Upon the upper end of shaft 126 is mounted pinion 127 which engages a stationary ring gear 128 formed integrally with the lower casing structure 31. This structure provides for the rotation of shaft 126 in a planetary manner upon rotation of the drive shaft 116 through the gearing as just described. Annular flange 129 fitting over the lower end of the planetary head serves to present a finished decorative appearance and to prevent downward seepage of lubricant and the like. Access to the attaching screws 41 for attaching the upper casing and the lower casing together is afforded by slipping off flange 129, followed by the removal of the pin for holding the planetary head in place, to effect the dropping of the planetary head from shaft 116.

The beater element 35 is attached to the lower end of the planetary shaft 126 by means of a bayonet type attachment, spring means 130 providing for retaining the beater in assembled position. To provide for the close approach of the beater to all parts of the bowl throughout its extent of movement, and to secure free and unobstructed removal thereof from the bowl, the radius of curvature of the edge of the beater is made substantially equal to that of the wall of the bowl, with only sufficient difference to provide the clearance necessary in operation. This provides for the close approach and substantially uniform spacing of the beater with respect to the bowl in all positions of operation. The center of curvature of the bowl is the same as that of the edge of the beater in its forwardmost position in the bowl, such center being located slightly above the pivot axis 32. As a result, when the device is tilted to inoperative position, the beater moves out of the bowl to such extent that removal of the bowl is possible without objectionable interference from the beater. If the device stops with the beater in the position shown in dotted lines in Fig. 1, it moves upwardly along the side wall of the bowl with the spacing gradually increasing as the beater is withdrawn until a final clearance and inoperative position is reached in which the lowermost part of the beater stands above the rim of the bowl, so that the bowl may be quickly and readily moved into and out of its operative position. If the beater stops in the full line position, the lowermost portion of the beater is sufficiently close to the top of the bowl and is so spaced inwardly from the rim that the bowl may likewise be readily removed and replaced; and in any other position of the beater, the conditions are intermediate those described so that no objectionable interference occurs at any position.

In order to provide a finished and attractive appearance for the assembled device, a trim strip 132, preferably of a bright metal appearance, is fastened to the upper casing portion 40. The strip has a width of such dimension as to contribute to the overall attractiveness of the device and may conveniently serve to carry suitable lettering such as the trade-mark or the like, and also the indexing means for cooperation with the speed control lever 90 and the latching lever 106. As shown in Fig. 3 the indicia 92 are formed upon the strip 132 at the proper positions. The strip is provided with a right angularly bent portion at one end which is fastened in place by screw 133 at a recess at the rear of the casing, extends entirely around the casing and its other end similarly formed is fastened by screws 134 at a similar recess on the opposite side of the casing. The strip is so positioned that its lower edge is substantially flush with the bottom of casing portion 40, and thus it abuts lower casing 31 in assembled position, effectively concealing the joint and avoiding unsightly appearance of the assembled housing so that it presents an attractive and overall finished appearance.

In the operation of the device the latching lever 106 is thrown to the unlocking position and the power drive unit is tilted to raise the planetary shaft 126 to convenient position for attaching beater element 35. The bowl is then placed over fastening screw 20 as previously described and locked in position thereon, the beater being raised sufficiently above the level of the bowl in inoperative withdrawn position so that adequate clearance is provided and the beater does not materially impede the rapid and easy positioning of the bowl. The motor may then be started or the beater may first be lowered into the bowl, and locked in place. The beater then operates with its highly effective planetary action throughout the entire contents of the bowl. The rotation of the beater is such that by reaction on the work material in the bowl there is a tendency to tighten the bowl upon the fastening screw 20 so that even if not secured firmly at the time of its positioning on the base, it will in operation be caused to more securely attach itself. At the end of the operation, the power drive unit may be unlatched and tilted to withdrawn position regardless of the location of the beater element, and the bowl then removed by rotation to unscrew the same from the threaded member 20. The threaded member 20 drops by gravity so that when released from the bowl, the bowl is only slightly raised above the plane supporting surface formed by bosses 14, and no objectionable tilting thereof occurs.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a food handling apparatus of the character described the combination of a base, a pedestal at one end of said base, a power drive unit, means for pivotally mounting said power drive unit on said pedestal, said power drive unit comprising a lower casing part and an upper casing part, means detachably fastening said casing parts together with adjacent edges thereof forming a substantially closed joint, and a relatively thin narrow trim strip fastened to one of said casing parts and overlapping the other of said casing parts in assembled position to conceal the joint between said parts and to provide a finished and attractive appearance.

2. In a food handing apparatus of the character described the combination of a base, a pedestal at one end of said base, a power drive unit, means for pivotally mounting said power drive unit on said pedestal, said power drive unit comprising a lower casing part and an upper casing part, motor drive means mounted in one of said casing parts and entirely supported thereby, transmission gearing for said drive means supported in the other of said casing parts, means detachably fastening said casing parts together with adjacent edges thereof forming a substantially closed joint, and a relatively thin narrow trim strip fastened to said upper casing part and extending slightly below the lower edge thereof to overlap and conceal the joint between the two parts of said casing when in assembled position.

3. In a food handling apparatus of the character described, the combination of a base, a pedestal at one end of said base, a power drive unit, means for pivotally mounting said power drive unit on said pedestal, said power drive unit comprising a lower casing part and an upper casing part detachably fastened thereto, means for controlling the speed of operation of said drive unit, a speed control member extending through said casing substantially at the parting line between said two casing parts, means for locking said drive unit in operative position upon said pedestal, and a locking control member also extending through said casing substantially at the parting line between said two casing parts.

4. In a food handling apparatus of the character described, the combination of a base, a pedestal at one end of said base, a power drive unit, means for pivotally mounting said power drive unit on said pedestal, said power drive unit comprising a lower casing part and an upper casing part detachably fastened thereto, means for controlling the speed of operation of said drive unit mounted in said upper casing part and extending through said casing substantially at the parting line between said two casing parts, means for locking said driving unit in operative position upon said pedestal, and a locking control member mounted in said lower casing part and extending through said casing substantially at the parting line between said two casing parts.

5. In a food handling apparatus of the character described, the combination of a base, a pedestal at one end of said base, a power drive unit comprising an elongated lower casing part and an elongated upper casing part, means for pivotally mounting said lower casing part on said pedestal, motor drive means entirely supported by said upper casing part and having the shaft of the motor extending longitudinally of the casing part, transmission gearing for driving a beater element supported in said lower casing part adjacent one end thereof, said transmission gearing extending upwardly into a position in which it is telescopically received within said upper casing part and is directly exposed in assembled relation upon separation of said casing parts, means on said motor shaft adapted to engage said gearing and provide a driving connection therewith in the assembled position of said casing parts, said connecting means providing for the free separation of the drive means and the gearing upon separation of the casing parts, and means for fastening said casing parts together to form a complete housing swingable about the pedestal and with the motor shaft in driving engagement with said gearing.

6. In a food handling apparatus of the character described, the combination of a base, a pedestal at one end of said base, a power drive unit, means for pivotally mounting said power unit on said pedestal, said power drive unit comprising a lower casing part and an upper casing part detachably fastened thereto, motor drive means supported in said upper casing part, means for controlling the speed of operation of said motor drive means mounted in said upper casing part, transmission gearing for driving a beater element supported in said lower casing part, locking means for locking said driving unit in operative position upon said pedestal mounted in said lower casing part, means providing a driving connection between said motor drive means and said transmission gearing in the assembled position of said casing parts, and means extending through said casing substantially at the parting line between said two casing parts for controlling the operation of said speed control means and said locking means.

7. In a food handling apparatus of the character described, the combination of a base, a pedestal at one end of said base, a lower casing part having a tongue depending therefrom, means in said pedestal for receiving and pivotally mounting said tongue to provide for swinging movement of said casing about said pedestal, a planetary head carried by said lower casing part in overhanging relation with respect to said base, gearing supported in said lower casing part providing for driving said planetary head, an upper casing part, a motor drive means mounted in said upper casing part and supported thereby, said motor drive means including means extending into a position for direct cooperative engagement with said gearing in the assembled position of said casing parts to provide a driving connection between said motor drive means and said gearing, said connecting means providing for the free separation of the drive means and the gearing upon separation of the casing parts, and means for fastening said casing parts together to form a complete housing swingable about said pedestal and with the motor drive means in driving engagement with said gearing.

DAVID A. MEEKER.
RUSSELL C. GEIGER.